United States Patent
Xu et al.

(10) Patent No.: US 11,601,145 B2
(45) Date of Patent: Mar. 7, 2023

(54) TUNABLE ANTENNA AND COMMUNICATIONS TERMINAL

(71) Applicant: Huawei Technologies Co., Ltd., Shenzhen (CN)

(72) Inventors: Qiuliang Xu, Shanghai (CN); Jianwen Lei, Shanghai (CN); Meng Hou, Shanghai (CN); Dan Qiu, Shanghai (CN); Hui Wang, Shanghai (CN); Xiaofei Xia, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/257,939

(22) PCT Filed: Jul. 31, 2018

(86) PCT No.: PCT/CN2018/097826
§ 371 (c)(1),
(2) Date: Jan. 5, 2021

(87) PCT Pub. No.: WO2020/024118
PCT Pub. Date: Feb. 6, 2020

(65) Prior Publication Data
US 2021/0281281 A1   Sep. 9, 2021

(51) Int. Cl.
*H04B 1/40* (2015.01)
*H04B 1/00* (2006.01)
(Continued)

(52) U.S. Cl.
CPC ......... *H04B 1/0064* (2013.01); *H01Q 1/2283* (2013.01); *H01Q 23/00* (2013.01); *H04B 1/50* (2013.01)

(58) Field of Classification Search
CPC ................ H04B 1/0064; H04B 1/04; H04B 2001/0408; H04B 1/40; H04B 1/1607; H04B 2001/1063; H04B 7/04
See application file for complete search history.

(56) References Cited

U.S. PATENT DOCUMENTS 6,639,541 B1   10/2003   Quintana et al.
9,288,031 B2 *  3/2016   Rousu .................. H04B 7/2621
(Continued)

FOREIGN PATENT DOCUMENTS

CN   1323468 A   11/2001
CN   1973400 A   5/2007
(Continued)

*Primary Examiner* — Nhan T Le
(74) *Attorney, Agent, or Firm* — Conley Rose, P.C.

(57) ABSTRACT

A tunable antenna. includes a radio frequency integrated circuit, a first frequency modulation branch coupled to the radio frequency integrated circuit, a first antenna coupled to the radio frequency integrated circuit through the first frequency modulation branch, a second antenna coupled to the radio frequency integrated circuit through a second frequency modulation branch. The first antenna corresponds to a first frequency, the second antenna corresponds to a second frequency, and the first frequency and the second frequency are respectively a transmit frequency and a receive frequency in a specified frequency band. The first antenna and the second antenna are respectively connected to the radio frequency integrated circuit through the frequency modulation branches when the tunable antenna is being designed.

20 Claims, 5 Drawing Sheets

(51) Int. Cl.
*H01Q 1/22* (2006.01)
*H01Q 23/00* (2006.01)
*H04B 1/50* (2006.01)

(56) References Cited

U.S. PATENT DOCUMENTS

| | | |
|---|---|---|
| 2007/0222697 A1 | 9/2007 | Caimi et al. |
| 2008/0030419 A1 | 2/2008 | Sjoblom |
| 2008/0090516 A1 | 4/2008 | Thomas et al. |
| 2008/0106476 A1 | 5/2008 | Tran et al. |
| 2010/0159823 A1 | 6/2010 | Smith |
| 2011/0175789 A1 | 7/2011 | Lee et al. |
| 2012/0019420 A1 | 1/2012 | Caimi et al. |
| 2012/0169565 A1 | 7/2012 | Morris, III |
| 2012/0243446 A1 | 9/2012 | Mueller et al. |
| 2013/0241800 A1 | 9/2013 | Schlub et al. |
| 2014/0073264 A1 | 3/2014 | Rofougaran |
| 2014/0355497 A1 | 12/2014 | Reiha |
| 2015/0009079 A1 | 1/2015 | Bojer |
| 2015/0305035 A1 | 10/2015 | Hu et al. |
| 2016/0065247 A1 | 3/2016 | Kim et al. |
| 2016/0126990 A1* | 5/2016 | Leipold .................. H04W 72/04 370/329 |
| 2016/0359506 A1* | 12/2016 | Ellae ........................ H04B 1/52 |
| 2017/0353287 A1* | 12/2017 | Onaka .................. H04B 1/0475 |

FOREIGN PATENT DOCUMENTS

| | | |
|---|---|---|
| CN | 101459442 A | 6/2009 |
| CN | 101529657 A | 9/2009 |
| CN | 103155431 A | 6/2013 |
| CN | 104205485 A | 12/2014 |
| CN | 105024726 A | 11/2015 |
| CN | 105359338 A | 2/2016 |
| CN | 105390798 A | 3/2016 |
| CN | 105897280 A | 8/2016 |
| CN | 107395247 A | 11/2017 |
| CN | 108183725 A | 6/2018 |
| EP | 2991232 A1 | 3/2016 |
| JP | 2008518495 A | 5/2008 |
| JP | 2016523064 A | 8/2016 |
| KR | 20160026483 A | 3/2016 |
| WO | 2011057302 A2 | 5/2011 |

\* cited by examiner

TUNABLE ANTENNA AND COMMUNICATIONS TERMINAL

CROSS-REFERENCE TO RELATED APPLICATIONS

This application is a U.S. National Stage of International Patent Application No. PCT/CN2018/097826 filed on Jul. 31, 2018, which is hereby incorporated by reference in its entirety.

TECHNICAL FIELD

This application relates to the field of communications technologies, and in particular, to a tunable antenna and a communications terminal.

BACKGROUND

Currently, an ID and a layout in a communications terminal are increasingly compact, and a global roaming requirement causes an increasing quantity of frequency bands that need to be supported by each mobile phone. Consequently, antenna commissioning and a PCB layout are very complex.

A tunable antenna is used in an existing communications terminal, and the tunable antenna selects a frequency band based on network searching. The mobile phone has many frequency bands. The tunable antenna does not need to support all the frequency bands at the same time, and only needs to tune a matching circuit based on an actual operating frequency band. For a tunable radio frequency front-end, for example, a tunable duplex and a tunable filter, one frequency band may be split into two parts for tuning. The two parts are a transmit link and a receive link respectively. Independent tuning and independent configuration of the entire links can be implemented. However, a current duplexer uses a transmit antenna and a receive antenna that are integrated together. In this case, isolation of the transmit antenna and the receive antenna needs to be considered. If dynamic tuning is performed, isolation of a common end of the transmit antenna and the receive antenna needs to be considered. Consequently, it is difficult to meet a requirement of a current product.

SUMMARY

This application provides a tunable antenna and a communications terminal, to improve antenna isolation.

According to a first aspect, this application provides a tunable antenna, applied to a communications terminal. The tunable antenna includes a radio frequency integrated circuit, where the radio frequency integrated circuit is used to send signals in different frequency bands; and further includes a second antenna and a first antenna, where the first antenna is used to transmit a signal, the second antenna is used to receive an antenna signal, and the receive antenna and the first antenna are separately connected to the radio frequency integrated circuit. To implement adjustment, a frequency modulation branch has a plurality of frequency bands, and can implement transmission or receiving in different frequency bands. The first antenna is connected to the radio frequency integrated circuit through the first frequency modulation branch. The second antenna is connected to the radio frequency integrated circuit through a second frequency modulation branch. The first antenna corresponds to a first frequency, the second antenna corresponds to a second frequency, and the first frequency and the second frequency are respectively a transmit frequency and a receive frequency in a specified frequency band. It can be learned from the foregoing description that, when the tunable antenna is being designed, the first antenna and the second antenna are separately disposed, and the first antenna and the second antenna are respectively connected to the radio frequency integrated circuit through the frequency modulation branches. Therefore, frequency bands of the first antenna and the second antenna may be separately adjusted. In addition, isolation between the first antenna and the second antenna includes isolation between the transmit antenna and the receive antenna, and isolation between the frequency modulation branches. This improves the isolation between the second antenna and the first antenna.

When the frequency modulation branch is specifically disposed, different manners may be used for implementation. The first frequency modulation branch includes a plurality of first frequency band branches, where the plurality of first frequency band branches correspond to different frequency bands, one end of each first frequency band branch is connected to the first antenna through a first selector switch, and the other end is connected to the radio frequency integrated circuit through a second selector switch.

During specific disposition, there may be one or more first frequency modulation branches. For example, there are two first frequency modulation branches, and the two first frequency modulation branches are connected to the first antenna through one first selector switch.

To improve a communication effect of the antenna, the tunable antenna further includes a power amplifier, where one end of the power amplifier is connected to the radio frequency integrated circuit, and the other end is electrically connected to the second selector switch. A signal sent from the radio frequency integrated circuit is amplified by the power amplifier and then transmitted to the first antenna. This improves performance of the antenna.

Filters are used when the first frequency band branches are specifically set to correspond to different frequency bands. A filter is disposed on each first frequency band branch. In addition, the filters on the first frequency band branches correspond to different frequency bands.

When the switches are specifically disposed, the first selector switch and the second selector switch each are a one-pole multi-throw switch. An immovable end of the first selector switch is connected to the first antenna, and a movable end is connected to each first frequency band branch in a one-to-one correspondence. An immovable end of the second selector switch is electrically connected to the power amplifier, and a movable end is connected to each second frequency band branch in a one-to-one correspondence. Different frequency band branches are selected by using the one-pole multi-throw switch.

The second antenna is a full-frequency antenna, so that the second antenna can receive signals in a plurality of frequency bands.

When the second antenna is implemented, the second frequency modulation branch includes a plurality of second frequency band branches, and the plurality of second frequency band branches correspond to different frequency bands. One end of each second frequency band branch is connected to the radio frequency integrated circuit, and the other end is optionally connected to the second antenna through a third selector switch.

In addition to the frequency modulation branch, another manner may be used. For example, the first frequency modulation branch includes a tunable filter.

Similarly, a tunable filter may also be used for the second frequency modulation branch.

In addition to the first antenna and the second antenna, the tunable antenna disclosed in this application further includes a third antenna. When the third antenna is specifically disposed, the third antenna is connected to the radio frequency integrated circuit through a second frequency modulation branch. The second frequency modulation branch has a plurality of frequency bands, so that the third antenna can correspond to different frequency bands.

When a third frequency modulation branch is specifically disposed, the second frequency modulation branch includes a plurality of second frequency band branches, and the plurality of second frequency band branches correspond to different frequency bands. One end of each second frequency band branch is connected to the radio frequency integrated circuit, and the other end is optionally connected to the third antenna through a fourth selector switch. A frequency band corresponding to the third antenna is selected by using the fourth selector switch.

During specific disposition, the fourth selector switch may be a one-pole multi-throw selector switch. A movable end and an immovable end corresponding to the fourth selector switch are respectively connected to the third antenna and the second frequency band branch.

According to a second aspect, a communications terminal is provided, where the communications terminal includes the tunable antenna according to any one of the foregoing descriptions. When the tunable antenna is being designed, the first antenna and the second antenna are respectively connected to the radio frequency integrated circuit through the frequency modulation branches. Therefore, frequency bands of the first antenna and the second antenna can be separately adjusted. This improves isolation between the second antenna and the first antenna.

DESCRIPTION OF EMBODIMENTS

To make the objectives, technical solutions, and advantages of this application clearer, the following further describes this application in detail with reference to the accompanying drawings.

To facilitate understanding of a tunable antenna provided in this embodiment of this application, an application scenario of the tunable antenna is first described. The tunable antenna is applied to a communications terminal, and the communications terminal may be a common communications terminal such as a base station or a signal tower.

Figure 1:
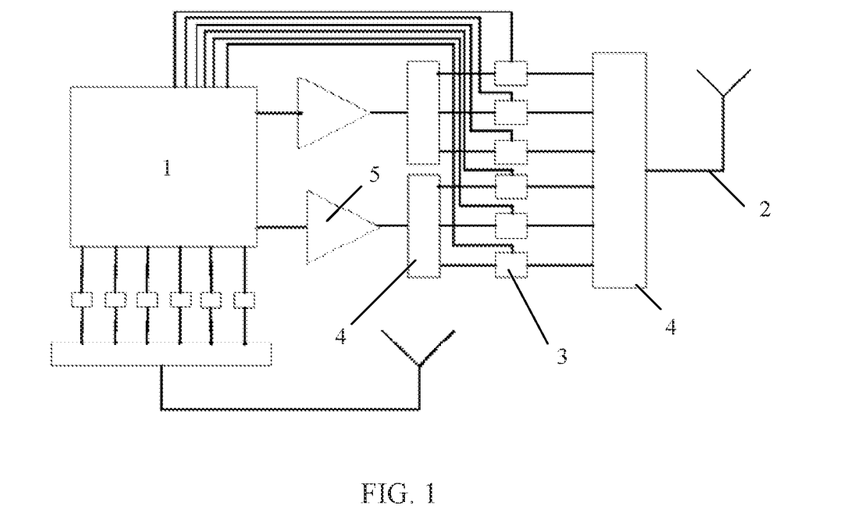
FIG. 1 is a schematic structural diagram of an antenna in the prior art.

FIG. 1 shows a structure of a tunable antenna in the prior art. The antenna includes a radio frequency integrated circuit 1. The radio frequency integrated circuit 1 is connected to a main antenna 2, and the main antenna 2 is used as both a transmit antenna and a receive antenna. During specific connection, the radio frequency integrated circuit 1 is connected to a plurality of parallel duplexers 3 by using a power amplifier 5. Different duplexers 3 are selected for connection by using a selector switch 4. It can be seen from FIG. 1 that, the duplexer uses a transmit antenna and a receive antenna that are integrated together, and in this case, isolation of the transmit antenna and the receive antenna needs to be considered. If dynamic tuning is performed, isolation of a common end of the transmit antenna and the receive antenna needs to be considered. Consequently, it is difficult to meet a requirement of a current product.

Figure 2:
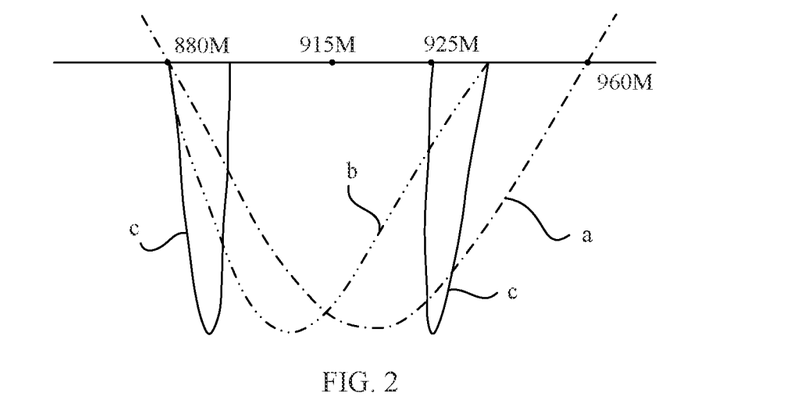
FIG. 2 is a schematic diagram of a frequency band according to an embodiment of this application.
Figure 3:
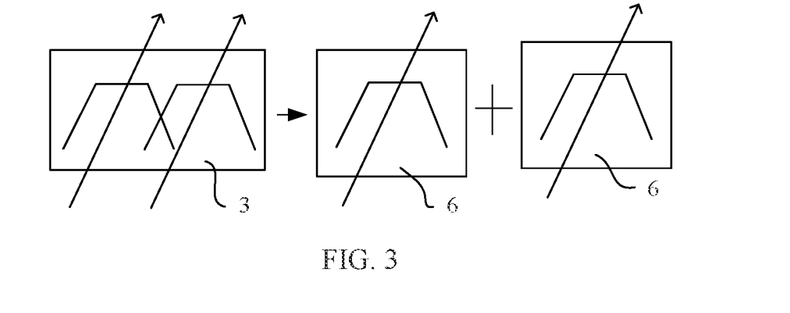
FIG. 3 is a schematic evolution diagram of a tunable antenna according to an embodiment of this application.

As shown in FIG. 2, an LTE band 8 is used as an example. A frequency range is from 880 MHz to 960 MHz. However, a transmit frequency of an antenna is from 880 MHz to 915 MHz, and a receive frequency of the antenna is from 925 MHz to 960 MHz. In the prior art, tuning needs to be performed on (880-960) MHz, that is, a bandwidth of 80 M as shown by the dotted line a in FIG. 2. Even for a solution of tuning after frequency band division, considering an LTE bandwidth of 10 MHz, for example, the first channel, tuning needs to be performed on 880 MHz to 925 MHz, that is, a bandwidth of 45 M as shown by a double-dotted line b in FIG. 2. However, a current duplexer uses a transmit antenna and a receive antenna that are integrated together, so that isolation of the transmit antenna and the receive antenna needs to be considered. If dynamic tuning is performed, isolation of a common end of the transmit end and the receive end needs to be considered, and a bandwidth requirement needs to be met. Consequently, final tuning efficiency may not be very good, and especially, efficiency of an edge frequency may be unsatisfactory. Therefore, in this embodiment of this application, as shown in FIG. 3, two separate filters 6 are used to replace one duplexer 3 in the prior art. As shown by solid lines in FIG. 2, when the separate filters are used (one filter corresponds to transmitting, and the other filter 6 corresponds to receiving), frequencies corresponding to the two filters 6 are shown by two solid curves c in FIG. 2, and a bandwidth corresponding to each filter 6 is 10 M. In this way, separate isolation and tuning for transmitting and receiving are implemented. The following describes in detail the tunable antenna provided in this embodiment of this application with reference to the accompanying drawings.

Figure 4:
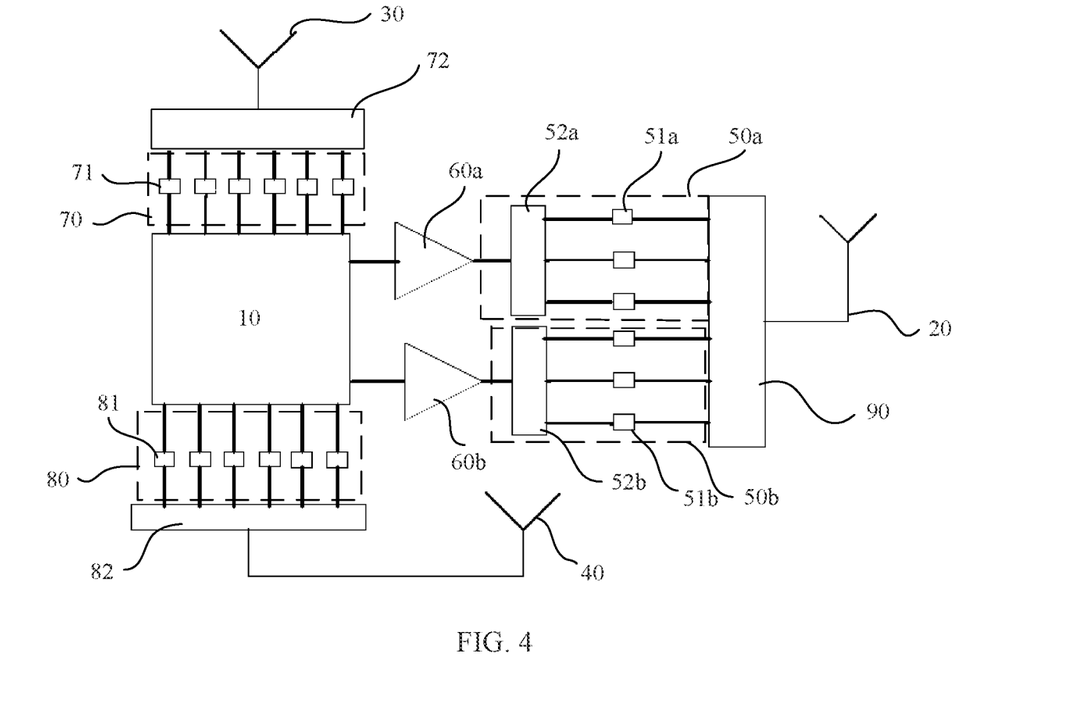
FIG. 4 is a schematic structural diagram of a tunable antenna according to an embodiment of this application.

Solutions disclosed in this application provide a tunable antenna. The tunable antenna is applied to a communications terminal. The following describes the tunable antenna provided in the embodiments of this application with reference to the accompanying drawings. First, FIG. 4 shows a structure of a tunable antenna according to an embodiment of this application. The tunable antenna mainly includes: a radio frequency integrated circuit 10, a first antenna 20, and a second antenna 30. The radio frequency integrated circuit 10 is used to send a signal to the first antenna 20 and receive a signal from the second antenna 30. The first antenna 20 corresponds to a first frequency, and the second antenna 30 corresponds to a second frequency. The first frequency and the second frequency are respectively a transmit frequency and a receive frequency in a specified frequency band. More specifically, the first antenna 20 is used to transmit a signal, the second antenna 30 is used to receive a signal, and both the first antenna 20 and the second antenna 30 are main antennas. The specified frequency band may be any frequency band in a band 1 to a band 44, as shown in the following table.

| E-URTRA band operating band | Uplink (UL) operating band BS receive UE transmit $F_{UL\_low}$-$F_{UL\_high}$ | Downlink (DL) operating band BS transmit UE receive $F_{UL\_low}$-$F_{UL\_high}$ | Duplex mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1447.9 MHz | 1475.9 MHz-1495.9 MHz | FDD |
| 12 | 699 MHz-716 MHz | 729 MHz-746 MHz | FDD |
| 13 | 777 MHz-787 MHz | 746 MHz-756 MHz | FDD |
| 14 | 788 MHz-798 MHz | 758 MHz-768 MHz | FDD |
| 15 | Reserved | Reserved | FDD |
| 16 | Reserved | Reserved | FDD |
| 17 | 704 MHz-716 MHz | 734 MHz-746 MHz | FDD |
| 18 | 815 MHz-830 MHz | 860 MHz-875 MHz | FDD |
| 19 | 830 MHz-845 MHz | 875 MHz-890 MHz | FDD |
| 20 | 832 MHz-862 MHz | 791 MHz-821 MHz | FDD |
| 21 | 1447.9 MHz-1462.9 MHz | 1495.9 MHz-1510.9 MHz | FDD |
| 22 | 3410 MHz-3490 MHz | 3510 MHz-3590 MHz | FDD |
| 23 | 2000 MHz-2020 MHz | 2180 MHz-2200 MHz | FDD |
| 24 | 1326.5 MHz-1660.5 MHz | 1525 MHz-1559 MHz | FDD |
| 25 | 1850 MHz-1915 MHz | 1930 MHz-1995 MHz | FDD |
| 26 | 814 MHz-849 MHz | 529 MHz-594 MHz | FDD |
| 27 | 807 MHz-824 MHz | 852 MHz-869 MHz | FDD |
| 28 | 703 MHz-748 MHz | 758 MHz-803 MHz | FDD |
| 29 | N/A | 717 MHz-728 MHz | FDD |
| 30 | 2305 MHz-2315 MHz | 2350 MHz-2360 MHz | FDD |
| 31 | 452.5 MHz-457.5 MHz | 462.5 MHz-467.5 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |
| 41 | 2496 MHz-2690 MHz | 2496 MHz-2690 MHz | TDD |
| 42 | 3400 MHz-3600 MHz | 3400 MHz-3600 MHz | TDD |
| 43 | 3600 MHz-3800 MHz | 3600 MHz-3800 MHz | TDD |
| 44 | 703 MHz-803 MHz | 703 MHz-803 MHz | TDD |

Figure 5:
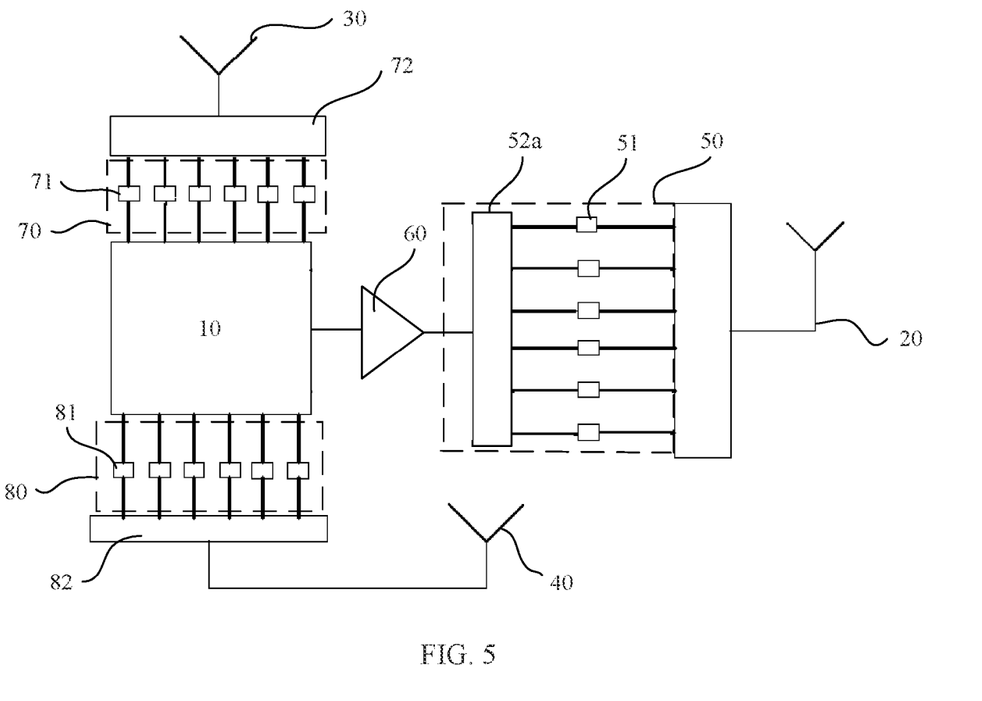
FIG. 5 is a schematic structural diagram of a tunable antenna according to an embodiment of this application.

The radio frequency integrated circuit 10 is connected to the first antenna 20 through a first frequency modulation branch. There may be one or two first frequency modulation branches. As shown in FIG. 4, there are two first frequency modulation branches: a first frequency modulation branch 50a and a first frequency modulation branch 50b. In this case, the radio frequency integrated circuit 10 is connected to the first frequency modulation branch 50a and the first frequency modulation branch 50b. In addition, the first antenna 20 is connected to the first frequency modulation branch 50a and the first frequency modulation branch 50b by using a selector switch. The first frequency modulation branch 50a and the first frequency modulation branch 50b are both frequency modulation branches, and correspond to different modulation frequencies. Certainly, one first frequency modulation branch 50 may be alternatively used. FIG. 5 is a schematic diagram of using one first frequency modulation branch 50 for the first antenna 20 and the radio frequency integrated circuit 10. A principle of using one first frequency modulation branch 50 is similar to a principle of using the first frequency modulation branch 50a and the first frequency modulation branch 50b. The following uses the first frequency modulation branch 50a and the first frequency modulation branch 50b as an example for description.

When the first frequency modulation branch 50a and the first frequency modulation branch 50b are used, different structures may be used for implementation. FIG. 4 shows specific structures of the first frequency modulation branch 50a and the first frequency modulation branch 50b. The following describes the first frequency modulation branch 50a and the first frequency modulation branch 50b with reference to FIG. 4.

First, both the first frequency modulation branch 50a and the first frequency modulation branch 50b include a plurality of parallel frequency band branches. The first frequency modulation branch 50a includes a plurality of parallel first frequency band branches 51a, and the plurality of parallel first frequency band branches 51a have different frequency bands. Similarly, the first frequency modulation branch 50b includes a plurality of parallel first frequency band branches 51b. The plurality of parallel first frequency band branches 51b have different frequency bands. In addition, the frequency bands corresponding to the first frequency band branches 51a are also different from those corresponding to the first frequency band branches 51b. During specific implementation, that the first frequency band branch 51a and the first frequency band branch 51b have different frequency bands, different first frequency band branches 51a have different frequency bands, and different first frequency band branches 51b have different frequency bands is implemented by disposing different filters. As shown in FIG. 4, a filter is separately disposed on each first frequency band branch 51a and each first frequency band branch 51b. Filters on different frequency band branches (the first frequency band branch 51a and the first frequency band branch 51b) correspond to different frequency bands. In this way, different frequency band branches correspond to different frequency bands.

For a quantity of first frequency band branches 51a and a quantity of first frequency band branches 51b, the quantity of first frequency band branches 51a may be different from the quantity of first frequency band branches 51b. As shown in FIG. 4, there are four first frequency band branches 51a, and there are four first frequency band branches 51b. Certainly, another different quantity of branches may alternatively be used. For example, there are three first frequency band branches 51a, and there are five first frequency band branches 51b, or there are other different quantities of branches.

When the radio frequency integrated circuit 10 is connected to the first antenna 20 by using the first frequency modulation branch 50a or the first frequency modulation branch 50b, a specific disposition manner is as follows: The radio frequency integrated circuit 10 is connected to the first frequency modulation branch 50a by using a first power amplifier 60a. The first power amplifier 60a is connected to one of the plurality of first frequency band branches 51a through a second selector switch 52a. The other ends of the plurality of first frequency band branches 51a are connected to the first selector switch 90, and are further connected to a main transmitter circuit 10 through the first selector switch 90. In the structure shown in FIG. 4, both the first selector switch 90 and the second selector switch 52a are one-pole multi-throw switches. A movable end of the first selector switch 90 is connected to the first antenna 20. There are a plurality of immovable ends, and the plurality of immovable ends are connected to the first frequency band branches 51a and the first frequency band branches 51b in a one-to-one correspondence. A movable end of the second selector switch 52a is connected to the first power amplifier 60a. The second selector switch 52a has four immovable ends, and the four immovable ends are respectively connected to the four first frequency band branches 51a. When the radio frequency integrated circuit 10 is connected to the first antenna 20 through the first frequency modulation branch 50a, the first selector switch 90 and the second selector switch 52a select a same first frequency band branch 51a, and a signal path is as follows: the radio frequency integrated circuit 10—the first power amplifier 60a—the second selector switch 52a—one first frequency band branch 51a—the first selector switch 90—the first antenna 20.

Still referring to FIG. 4, similarly, for the first frequency modulation branch 50b, the radio frequency integrated circuit 10 is connected to the first frequency modulation branch 50b through a second power amplifier 60b. The second power amplifier 60b is connected to the plurality of first frequency band branches 51b through a second selector switch 52b. The other ends of the plurality of first frequency band branches 51b are connected to the first antenna 20 through the first selector switch 90. The second selector switch 52b is also a one-pole multi-throw switch, and is specifically a one-pole four-throw switch in FIG. 4. In addition, a movable end of the second selector switch 52b is connected to the second power amplifier 60b, and each of four immovable ends of the second selector switch 52b is connected to one first frequency band branch 51b. When the radio frequency integrated circuit 10 is connected to the first antenna 20 through the first frequency modulation branch 50b, the second selector switch 52b and the first selector switch 90 select a same first frequency band branch 51b, and a signal path is as follows: the radio frequency integrated circuit 10—the second power amplifier 60b—the second selector switch 52b—one first frequency band branch 51b—the first selector switch 90—the first antenna 20.

FIG. 5 shows a case in which one first tunable frequency band branch 50 is used. In this case, the radio frequency integrated circuit 10 is connected to a power amplifier 60. The power amplifier 60 is connected to a second selector switch 52. The second selector switch 52 is connected to a plurality of first frequency band branches 51. The other ends of the plurality of first frequency band branches 51 are connected to the first selector switch 90. The first selector switch 90 is connected to the first antenna 10. The first frequency modulation branch 50 includes a plurality of first frequency band branches 51, and the plurality of parallel first frequency band branches 51 have different frequency bands. The first frequency band branches 51 are specifically implemented by disposing different filters. As shown in FIG. 4, a filter is disposed on each first frequency band branch 51, and filters on different first frequency band branches 51 correspond to different frequency bands, so that different frequency band branches correspond to different frequency bands. One end of each first frequency band branch 51 is connected to an immovable end of the first selector switch 90, and the other end is connected to an immovable end of the second selector switch 52. A movable end of the second selector switch 52 is connected to the power amplifier 60, and a movable end of the first selector switch 90 is connected to the first antenna 20. During use, the first selector switch 90 and the second selector switch 52 select a same frequency band branch 51. A transmit signal of the radio frequency integrated circuit 10 is transmitted through the following path: the power amplifier 60—the second selector switch 52—the first frequency band branch 51—the first selector switch 90—the first antenna 20.

Figure 6:
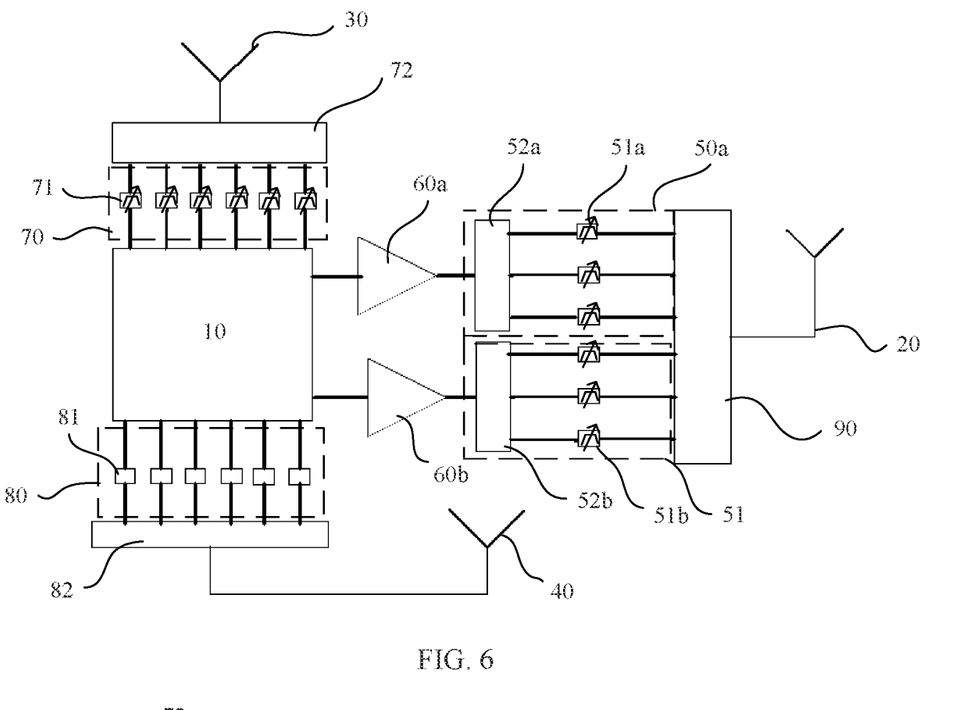
FIG. 6 is a schematic structural diagram of a tunable antenna according to an embodiment of this application.

In the tunable antenna shown in FIG. 4, a filter used for the first frequency modulation branch 50a and a filter used for the first frequency modulation branch 50b are non-tunable filters. In this embodiment of this application, a tunable filter may be alternatively used. As shown in FIG. 6, filters on both the first frequency modulation branch 50a and the first frequency modulation branch 50b are tunable filters, so that the filter can be adjusted to correspond to a corresponding frequency band. It should be understood that, when the tunable filter shown in FIG. 6 is used, each tunable filter corresponds to a different adjustable frequency band and a different adjustable range, so as to correspond to a different frequency band of the first antenna 20.

The first power amplifier 60a and the second power amplifier 60b in FIG. 4 may be disposed based on a requirement. When power amplification is not required, the first power amplifier 60a and the second power amplifier 60b may not be disposed.

Figure 7:
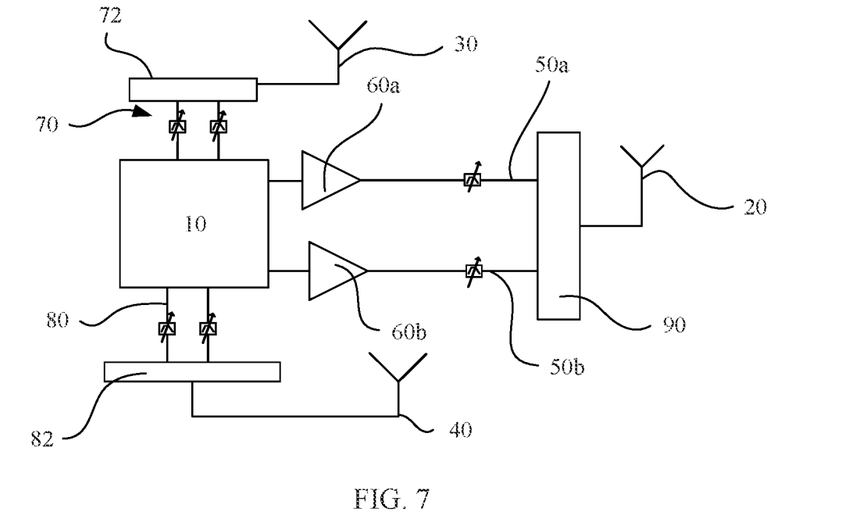
FIG. 7 is a schematic structural diagram of a tunable antenna according to an embodiment of this application.

In addition to the structure of the first frequency modulation branch 50a and the first frequency modulation branch 50b shown in FIG. 4, a structure shown in FIG. 7 may be alternatively used. In the structure shown in FIG. 7, the first frequency modulation branch 50a is a branch with a tunable filter, and the first frequency modulation branch 50b is also a branch with a tunable filter. In this case, the first frequency modulation branch 50a and the first frequency modulation branch 50b each are a single branch. During specific connection, as shown in FIG. 7, the radio frequency integrated circuit 10 is connected to the first frequency modulation branch 50a through the first power amplifier 60a, and is connected to the first frequency modulation branch 50b through the second power amplifier 60b. The first selector switch 90 is a single-pole double-throw switch. Immovable ends of the first selector switch 90 are in a one-to-one correspondence with the first frequency modulation branch 50a and the first frequency modulation branch 50b, and a movable end of the first selector switch 90 is connected to the first antenna 20. The first frequency modulation branch 50a and the first frequency modulation branch 50b are selected by using the first selector switch 90 to connect to the radio frequency integrated circuit 10. In addition, a corresponding frequency band is adjusted by adjusting the tunable filter on the first frequency modulation branch 50a and the tunable filter on the first frequency modulation branch 50b. Using the first frequency modulation branch 50a as an example, by adjusting a resonance point of the tunable filter, the first frequency modulation branch 50a may be equivalent to different first frequency band branches in FIG. 4. Therefore, a structure of the entire first frequency modulation branch 50a is simplified by using one tunable filter. During specific setting, in FIG. 4, the tunable filter on the first frequency modulation branch 50a is used to adjust an intermediate frequency and a high frequency of the first antenna 20, and the tunable filter on the first frequency modulation branch 50b is used to adjust a low frequency of the first antenna 20. Certainly, the tunable filter on the first frequency modulation branch 50a may be alternatively used to adjust a low frequency of the first antenna 20, and the tunable filter on the first frequency modulation branch 50b may be alternatively used to adjust an intermediate frequency and a high frequency of the first antenna 20.

Figure 8:
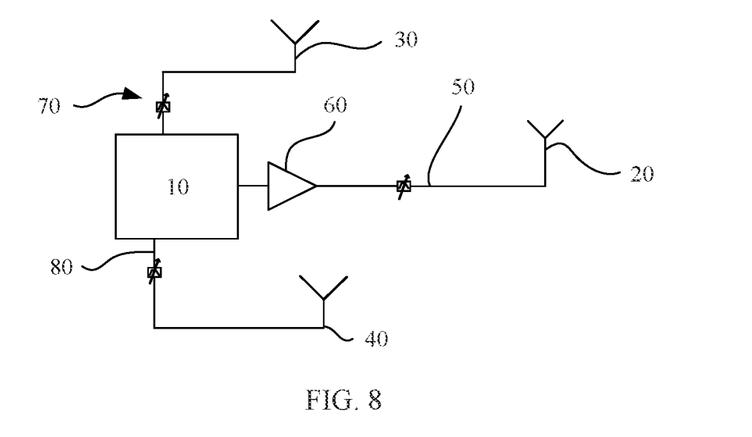
FIG. 8 is a schematic structural diagram of a tunable antenna according to an embodiment of this application.

As shown in FIG. 8, one first frequency modulation branch 50 on which one tunable filter is disposed may be alternatively used to adjust a frequency band. In this case, no selector switch is required, and the entire transmitter circuit includes only the radio frequency integrated circuit 10, the power amplifier 60 connected to the radio frequency integrated circuit, the first frequency modulation branch 50 connected to the power amplifier, and the first antenna 20 connected to the first frequency modulation branch 50. During use, a transmit signal of the radio frequency integrated circuit 10 is transmitted through the following path: the power amplifier 60—the first frequency modulation branch 50—the first antenna 20. During transmission, the tunable filter is adjusted to a frequency band corresponding to the transmit signal.

It can be learned from the foregoing description that the disposed first frequency modulation branch 50a and the disposed first frequency modulation branch 50b can separately control a frequency band of a main transmit antenna. Still referring to FIG. 4, when the second antenna 30 is disposed, the tunable antenna provided in this embodiment of this application is also used to separately control a frequency band.

As shown in FIG. 4, for the tunable antenna provided in this embodiment of this application, the radio frequency integrated circuit 10 is connected to the second antenna 30 by using a second frequency modulation branch 70. When the second frequency modulation branch 70 is disposed, the second frequency modulation branch 70 includes a plurality of second frequency band branches 71. In addition, the plurality of second frequency band branches 71 correspond to different frequency bands. One end of each second frequency band branch 71 is connected to the radio frequency integrated circuit 10, and the other end is optionally connected to the second antenna 30 by using a third selector switch 72. The third selector switch 72 is also a one-pole multi-throw switch. Still referring to FIG. 4, the second frequency modulation branch 70 includes five second frequency band branches 71, and different second frequency band branches 71 correspond to different frequency bands. During specific disposition, one filter is disposed on each second frequency band branch 71, and different filters correspond to different frequency bands. The different filters are disposed to control frequency bands corresponding to different second frequency band branches 71. The third selector switch 72 is a one-pole multi-throw switch, and corresponds to a one-pole five-throw switch in the structure shown in FIG. 4. In addition, a movable end of the third selector switch 72 is connected to the second antenna 30, and each immovable end of the third selector switch 72 corresponds to one second frequency band branch 71. During connection, one second frequency band branch 71 is selected by using the third selector switch 72. In this case, a signal connection is as follows: the second antenna 30—the third selector switch 72—the second frequency band branch 71—the radio frequency integrated circuit 10.

The filter on the second frequency band branch 71 may be a non-tunable filter shown in FIG. 4, or may be a tunable filter shown in FIG. 5. When the tunable filter shown in FIG. 5 is used, tunable filters on the second frequency band branches 71 have different adjustment ranges, so as to correspond to different frequency bands of the second antenna 30.

Certainly, it should be understood that the second frequency modulation branch 70 provided in this embodiment of this application is not limited to the structure in FIG. 4, and may alternatively use the structure in FIG. 7. In this case, the second frequency modulation branch 70 is a branch with a tunable filter. A resonance point of the tunable filter is adjusted, so that the second antenna 30 corresponds to different frequency bands. The tunable filter connecting the third antenna 40 and the radio frequency integrated circuit 10 may be one tunable filter or two tunable filters connected in parallel. As shown in FIG. 7, the two tunable filters connected in parallel are used. In this case, the third selector switch 72 is correspondingly disposed to select a different tunable filter to connect to the second antenna 30. Certainly, when the two tunable filters are selected, the two tunable filters correspond to different adjustment frequency bands, and separately correspond to a high frequency, an intermediate frequency, and a low frequency of the second antenna 30. For details, refer to descriptions of the two tunable filters corresponding to the first antenna 20. Details are not described herein.

As shown in FIG. 8, there may be one first frequency modulation branch 50 and one second frequency modulation branch 40. In addition, a tunable filter is disposed on each of the first frequency modulation branch 50 and the second frequency modulation branch 40. In this case, no selector switch is required, and the radio frequency integrated circuit 10 is directly connected to the first frequency modulation branch 50 and the second frequency modulation branch 40. The first frequency modulation branch 50 is connected to the first antenna 20. The second frequency modulation branch 40 is connected to the second antenna 30. During use, a receive signal is received through the following path: the second antenna 30—the second frequency modulation branch 40—the radio frequency integrated circuit 10. During signal receiving, the tunable filter is adjusted to a frequency band corresponding to a transmit signal. For example, when a signal in a frequency band of band 8 is being received, the tunable filter is adjusted to 925 MHz to 935 MHz. During signal transmission, a transmit signal of the radio frequency integrated circuit 10 is transmitted through the following path: the power amplifier 60—the first frequency modulation branch 50—the first antenna 20. During transmission, the tunable filter is adjusted to a frequency band corresponding to the transmit signal. For example, when a signal corresponding to a frequency band of band 8 is being transmitted, the tunable filter is adjusted to 880 MHz to 890 MHz.

Figure 9:
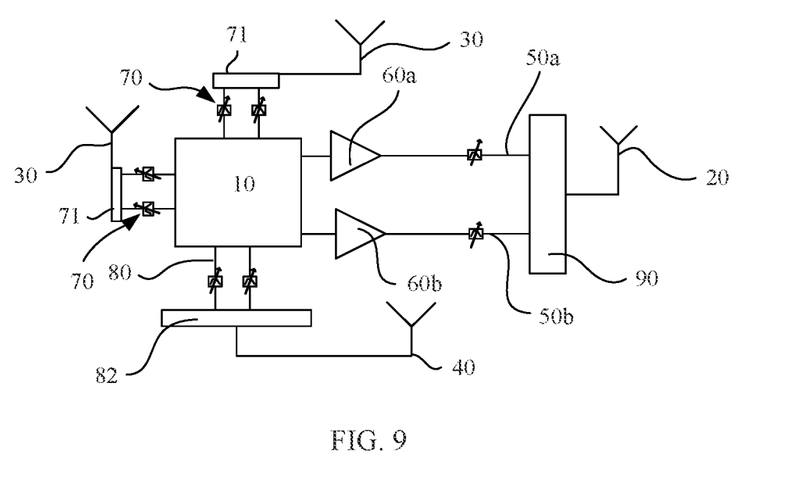
FIG. 9 is a schematic structural diagram of a tunable antenna according to an embodiment of this application.

For the tunable antenna shown in FIG. 7 and FIG. 8, there is one second antenna 30, and the second antenna 30 is a full-frequency antenna. Certainly, there may be a plurality of second antennas 30, for example, two second antennas 30, three second antennas 30, or a different quantity of second antennas 30. In this case, different second antennas 30 correspond to different frequency bands. FIG. 9 shows two second antennas 30, where a frequency band corresponding to one tunable filter on one second antenna 30 is band 2+band 4, and a frequency band corresponding to a tunable filter on another frequency modulation branch is band 1+band 3; and a frequency band corresponding to the other second antenna 30 is band 7. It should be understood that the foregoing specific frequency band is a specific example. The second antenna 30 provided in this embodiment of this application may alternatively correspond to another different frequency band. For example, when three second antennas are used, the three second antennas are respectively corresponding to the high frequency band, the intermediate frequency band, and the low frequency band.

However, regardless of whether one second antenna 30 or a plurality of second antennas 30 are used, each second antenna 30 is connected to the radio frequency integrated circuit 10 by using a tunable branch. A structure of the second antenna is similar to the structure described above, and details are not described herein.

It should be understood that, in the foregoing specific embodiment, two different specific implementations are provided for the first frequency modulation branch 50a, the first frequency modulation branch 50b, and the second frequency modulation branch 70. However, for the tunable antenna provided in this embodiment of this application, any known solution that can implement frequency band adjustment can be applied to the first frequency modulation branch 50a, the first frequency modulation branch 50b, and the second frequency modulation branch 70 provided in the embodiments of this application. The solution is not limited to the specific embodiments shown in FIG. 4 to FIG. 9. For example, one first frequency modulation branch may be used and a non-tunable filter is used for the frequency modulation branch, but a tunable filter is used on a used second frequency modulation branch.

Still referring to FIG. 4 to FIG. 9, in addition to the first antenna 20 and the second antenna 30 described above, the tunable antenna provided in this embodiment of this application further includes a third antenna 40. The third antenna 40 is a diversity antenna. During specific connection, the third antenna 40 is connected to the radio frequency integrated circuit 10 through a third frequency modulation branch 80. A structure of the third frequency modulation branch 80 is similar to that of the second frequency modulation branch 70. Alternatively, a plurality of parallel third frequency band branches 81 may be used. In addition, one end of the third frequency band branch 81 is connected to the radio frequency integrated circuit 10, and the other end is connected to the third antenna 40 by using a fourth selector switch 82. As shown in FIG. 4, the fourth selector switch 82 is a one-pole multi-throw switch, and specifically is a one-pole five-throw switch in FIG. 4. In addition, a movable end is connected to the third antenna 40, and immovable ends are respectively connected to five frequency band branches in a one-to-one correspondence. During connection, different third frequency band branches 81 are selected by using the fourth selector switch 82. Certainly, the third frequency modulation branch 80 may alternatively use a structure with a tunable filter, and a structure of the third frequency modulation branch 80 is shown in FIG. 8. Certainly, there may be one or two third frequency band branches 80.

It can be learned from the foregoing description that, for the tunable antenna provided in the embodiments of this application, for a frequency division duplex frequency, all links of the main transmit antenna and the second antenna 30 are separately controlled. A link from a receive port of the radio frequency integrated circuit 10 to the antenna are adjustable, and all the links of the main transmit antenna and the second antenna 30 are separately controlled and separately tuned. Isolation between receiving and transmitting of the antennas includes: isolation between the first antenna and the first antenna and isolation between the first frequency modulation branch 50a and the first frequency modulation branch 50b. Compared with the prior art in which isolation is performed only by using a duplexer, the tunable antenna provided in the embodiments of this application increases isolation between the transmit antenna and the receive antenna. In addition, an embodiment of this application further provides a communications terminal. The communications terminal includes the tunable antenna according to any one of the foregoing embodiments. When the tunable antenna is being designed, the first antenna 20 and the second antenna 30 are respectively connected to the radio frequency integrated circuit 10 through the frequency modulation branches. Therefore, frequency bands of the first antenna 20 and the second antenna 30 can be separately adjusted. This improves isolation between the second antenna 30 and the first antenna 20.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A tunable antenna applied to a communications terminal, wherein the tunable antenna comprises:
   a radio frequency integrated circuit;
   a first frequency modulation branch coupled to the radio frequency integrated circuit, wherein the first frequency modulation branch comprises a plurality of first frequency band branches corresponding to different frequency bands;
   a first antenna coupled to the radio frequency integrated circuit through the first frequency modulation branch, wherein the first antenna corresponds to a first frequency, and wherein the first frequency is a transmit frequency in a frequency band;
   a first selector switch and a second selector switch, wherein a first end of each of the first frequency band branches is coupled to the first antenna through the first selector switch, and wherein a second end of each of the first frequency band branches is coupled to the radio frequency integrated circuit through the second selector switch;
   a second frequency modulation branch coupled to the radio frequency integrated circuit, wherein the second frequency modulation branch comprises a plurality of second frequency band branches corresponding to different frequency bands, and wherein a third end of each of the second frequency band branches is coupled to the radio frequency integrated circuit;
   a second antenna coupled to the radio frequency integrated circuit through the second frequency modulation branch, wherein the second antenna corresponds to a second frequency, and wherein the second frequency is a receive frequency in the frequency band;
   a third selector switch, wherein a fourth end of each of the second frequency band branches is coupled to the second antenna through the third selector switch; and
   a power amplifier coupled to the radio frequency integrated circuit and configured to amplify signals from the radio frequency integrated circuit.

2. The tunable antenna of claim 1, wherein the power amplifier comprises:
   a fifth end coupled to the radio frequency integrated circuit; and
   a sixth end electrically coupled to the second selector switch.

3. The tunable antenna of claim 2, further comprising a filter disposed on each of the first frequency band branches.

4. The tunable antenna of claim 2, wherein each of the first selector switch and the second selector switch comprises a one-pole multi-throw switch, wherein a first immovable end of the first selector switch is coupled to the first antenna, wherein a first movable end of the first selector switch is coupled to each of the first frequency band branches in a one-to-one correspondence, wherein a second immovable end of the second selector switch is electrically coupled to the power amplifier, and wherein a second movable end is coupled to each of second frequency band branches of the second frequency modulation branch in a one-to-one correspondence.

5. The tunable antenna of claim 4, further comprising two first frequency modulation branches coupled to the first antenna through the first selector switch.

6. The tunable antenna of claim 1, wherein the second antenna is a full-frequency antenna.

7. The tunable antenna of claim 1, wherein the first frequency modulation branch comprises a first tunable filter, and wherein the second frequency modulation branch comprises a second tunable filter.

8. The tunable antenna of claim 1, further comprising a third antenna coupled to the radio frequency integrated circuit through the second frequency modulation branch.

9. The tunable antenna of claim 8, further comprising a fourth selector switch, wherein a fifth end of each of the second frequency band branches is coupled to the third antenna through the fourth selector switch.

10. A communications terminal comprising:
a tunable antenna comprising:
a radio frequency integrated circuit;
a first frequency modulation branch coupled to the radio frequency integrated circuit, wherein the first frequency modulation branch comprises a plurality of first frequency band branches corresponding to different frequency bands;
a first antenna coupled to the radio frequency integrated circuit through the first frequency modulation branch, wherein the first antenna corresponds to a first frequency, and wherein the first frequency is a transmit frequency in a frequency band;
a first selector switch and a second selector switch, wherein a first end of each of the first frequency band branches is coupled to the first antenna through the first selector switch, and wherein a second end of each of the first frequency band branches is coupled to the radio frequency integrated circuit through the second selector switch;
a second frequency modulation branch coupled to the radio frequency integrated circuit, wherein the second frequency modulation branch comprises a plurality of second frequency band branches corresponding to different frequency bands, and wherein a third end of each of the second frequency band branches is coupled to the radio frequency integrated circuit;
a second antenna coupled to the radio frequency integrated circuit through the second frequency modulation branch, wherein the second antenna corresponds to a second frequency, and wherein the second frequency is a receive frequency in the frequency band;
a third selector switch, wherein a fourth end of each of the second frequency band branches is coupled to the second antenna through the third selector switch; and
a power amplifier coupled to the radio frequency integrated circuit and configured to amplify signals from the radio frequency integrated circuit.

11. The communications terminal of claim 10, wherein the power amplifier comprises:
a fifth end coupled to the radio frequency integrated circuit; and
a sixth end electrically coupled to the second selector switch.

12. The communications terminal of claim 11, further comprising a filter disposed on each of the first frequency band branches.

13. The communications terminal of claim 12, wherein each of the first selector switch and the second selector switch comprises a one-pole multi-throw switch, wherein a first immovable end of the first selector switch is coupled to the first antenna, wherein a first movable end of the first selector switch is coupled to each of the first frequency band branches in a one-to-one correspondence, wherein a second immovable end of the second selector switch is electrically coupled to the power amplifier, and wherein a second movable end of the second selector switch is coupled to each of second frequency band branches of the second frequency modulation branch in a one-to-one correspondence.

14. The communications terminal of claim 13, further comprising two first frequency modulation branches coupled to the first antenna through the first selector switch.

15. The communications terminal of claim 10, wherein the second antenna is a full-frequency antenna.

16. An apparatus comprising:
a tunable antenna comprising:
a radio frequency integrated circuit;
a first frequency modulation branch coupled to the radio frequency integrated circuit, wherein the first frequency modulation branch comprises a plurality of first frequency band branches corresponding to different frequency bands;
a first antenna coupled to the radio frequency integrated circuit through the first frequency modulation branch, wherein the first antenna corresponds to a first frequency, and wherein the first frequency is a transmit frequency in a frequency band;
a first selector switch and a second selector switch, wherein a first end of each of the first frequency band branches is coupled to the first antenna through the first selector switch, and wherein a second end of each of the first frequency band branches is coupled to the radio frequency integrated circuit through the second selector switch;
a second frequency modulation branch coupled to the radio frequency integrated circuit, wherein the second frequency modulation branch comprises a plurality of second frequency band branches corresponding to different frequency bands, and wherein a third end of each of the second frequency band branches is coupled to the radio frequency integrated circuit;
a second antenna coupled to the radio frequency integrated circuit through the second frequency modulation branch, wherein the second antenna corresponds to a second frequency, wherein the second frequency is a receive frequency in the frequency band, and wherein the second antenna is a full-frequency antenna;
a third selector switch, wherein a fourth end of each of the second frequency band branches is coupled to the second antenna through the third selector switch; and a power amplifier coupled to the radio frequency integrated circuit and configured to amplify signals from the radio frequency integrated circuit.

17. The apparatus of claim 16, wherein the power amplifier comprises:
  a fifth end coupled to the radio frequency integrated circuit; and
  a sixth end electrically coupled to the second selector switch.

18. The apparatus of claim 17, further comprising a filter disposed on each of the first frequency band branches.

19. The apparatus of claim 16, wherein the first frequency modulation branch comprises a first tunable filter, and wherein the second frequency modulation branch comprises a second tunable filter.

20. The apparatus of claim 16, further comprising a third antenna coupled to the radio frequency integrated circuit through the second frequency modulation branch.

\* \* \* \* \*